(12) United States Patent
Lehman et al.

(10) Patent No.: US 10,215,882 B2
(45) Date of Patent: Feb. 26, 2019

(54) TAGGED CHEMICAL DIVERTER

(71) Applicant: CARBO CERAMICS INC., Houston, TX (US)

(72) Inventors: Lyle V. Lehman, Katy, TX (US); Bradley Todd, Duncan, OK (US); Don Conkle, Katy, TX (US)

(73) Assignee: CARBO CERAMICS INC., Houston, TX (US)

( * ) Notice: Subject to any disclaimer, the term of this patent is extended or adjusted under 35 U.S.C. 154(b) by 0 days.

(21) Appl. No.: 15/853,273

(22) Filed: Dec. 22, 2017

(65) Prior Publication Data

US 2018/0180762 A1 Jun. 28, 2018

Related U.S. Application Data

(60) Provisional application No. 62/439,319, filed on Dec. 27, 2016.

(51) Int. Cl.
*C09K 8/42* (2006.01)
*G01V 5/10* (2006.01)

(52) U.S. Cl.
CPC ............. *G01V 5/102* (2013.01); *C09K 8/426* (2013.01); *G01V 5/101* (2013.01)

(58) Field of Classification Search
CPC ................................ C09K 8/426; G01V 5/102
See application file for complete search history.

(56) References Cited

U.S. PATENT DOCUMENTS

| | | | | |
|---|---|---|---|---|
| 2016/0046854 A1* | 2/2016 | Gordon | .................... | C09K 8/42 166/250.12 |
| 2016/0177693 A1* | 6/2016 | Gomaa | ................. | E21B 43/267 166/250.07 |

* cited by examiner

*Primary Examiner* — Mark R Gaworecki
(74) *Attorney, Agent, or Firm* — Patterson + Sheridan, LLP

(57) ABSTRACT

The present disclosure provides methods for identifying chemical diverter material placed in a borehole region and provides chemical diverter material. In one embodiment, a method for detecting diverter material placed in a borehole region includes (a) obtaining a first data set by: emitting pulses of neutrons from the pulsed neutron source into the borehole region and detecting capture gamma rays resulting from nuclear reactions in the borehole region; (b) placing a diverter material comprising aqueous-swellable particles and a thermal neutron absorbing material into the borehole region; (c) obtaining a second data set by: emitting pulses of neutrons from the first pulsed neutron source or a second pulsed neutron source into the borehole region, and detecting capture gamma rays in the borehole; and (d) comparing the first data set and the second data set to determine the location of diverter material placed in the borehole region.

13 Claims, No Drawings

TAGGED CHEMICAL DIVERTER

CROSS-REFERENCE TO RELATED APPLICATIONS

This application is a U.S. non-provisional patent application that claims the benefit of a U.S. provisional patent application Ser. No. 62/439,319 filed Dec. 27, 2016. The aforementioned related patent application is incorporated herein by reference in its entirety.

FIELD

The present disclosure provides methods for identifying chemical diverter material placed in a borehole region and provides chemical diverter material.

BACKGROUND

In order to more effectively produce hydrocarbons from downhole formations, and especially in formations with low porosity and/or low permeability, induced fracturing (called "frac operations", "hydraulic fracturing", or simply "fracing") of the hydrocarbon-bearing formations has been a commonly used technique. In a typical frac operation, fluids are pumped downhole under high pressure, causing the formations to fracture around the borehole, creating high permeability conduits that promote the flow of the hydrocarbons into the borehole. These frac operations can be conducted in horizontal and deviated, as well as vertical, boreholes, and in either uncased wells, or in cased wells through perforations. The frac operations can be conducted in intervals, also called stages or "clusters," where each stage or cluster contains multiple perforations.

Chemical diverters are often times utilized in frac operations. These diverters can aid in diverting fluid to each frac cluster so that each cluster receives its proportional share of fluid and proppant during the frac operation. Diverter materials can include materials such as particulates, polymers, or viscosified fluids that can form a fluid impermeable plug in a selected perforation. The diverter "plugs" an open perforation to create excess pressure throughout the interior volume of the casing. This excess pressure acts to open other, un-plugged perforations to divert frac-fluids into the now open perforations. Currently, there is no method of knowing which clusters in a stage have been plugged and which perforation clusters are capable of or incapable of being open with diversion.

Therefore, a need exists for methods for determining which perforation clusters are plugged, open and not plugged, or closed and not plugged. There is a need for methods for identifying chemical diverter material placed in a borehole region and a need for chemical diverter material.

SUMMARY

In one embodiment, a method for detecting diverter material placed in a borehole region includes (a) obtaining a first data set by: emitting pulses of neutrons from the pulsed neutron source into the borehole region and detecting capture gamma rays resulting from nuclear reactions in the borehole region; (b) placing a diverter material comprising aqueous-swellable particles and a thermal neutron absorbing material into the borehole region; (c) obtaining a second data set by: emitting pulses of neutrons from the first pulsed neutron source or a second pulsed neutron source into the borehole region, and detecting capture gamma rays in the borehole; and (d) comparing the first data set and the second data set to determine the location of diverter material placed in the borehole region.

In another embodiment, a method for detecting diverter material placed in a borehole region includes: (a) placing a diverter material comprising aqueous-swellable particles and a thermal neutron absorbing material coated on the aqueous-swellable particles into the borehole region; (b) obtaining a first data set by: (i) lowering into a borehole traversing the borehole region a pulsed neutron logging tool comprising a pulsed neutron source and a detector, (ii) emitting pulses of neutrons from the pulsed neutron source into the borehole region, (iii) detecting capture gamma rays in the borehole region; (c) removing at least a portion of the diverter material from the borehole region; (d) obtaining a second data set by: (i) emitting pulses of neutrons from the first pulsed neutron source or a second pulsed neutron source into the borehole region, (ii) detecting capture gamma rays in the borehole; and (e) comparing the first data set and the second data set to determine the effectiveness of removal of the diverter material placed in the borehole region.

DETAILED DESCRIPTION

According to several exemplary embodiments, a method is provided for determining the location of tagged material using a downhole tool. The method can include obtaining a pre-diverter data set, placing a fluid that includes a chemical diverter in which all or a fraction of such chemical diverter includes a thermal neutron absorbing material into a borehole region of a well bore, obtaining a post-diverter data set, comparing the pre-diverter data set and the post-diverter data set to determine a location and/or presence of the tagged diverter material. According to several exemplary embodiments, the pre-diverter data set can be eliminated. For example, the pre-diverter data set can be eliminated if capture gamma ray spectral data processing is included in the log processing.

The pre-diverter and post-diverter data sets can be obtained by lowering into a borehole traversing a subterranean formation, a neutron emitting tool including a pulsed fast neutron source and one or more gamma ray detectors, emitting pulses of fast neutrons from the neutron source into the borehole region, and detecting in the borehole region inelastic and capture gamma rays resulting from nuclear reactions of the source neutrons with elements in the borehole region. For purposes of this application, the term "borehole region" includes the logging tool, the borehole fluid, the tubulars in the wellbore, diverter material, and any other annular material such as cement that is located between the formation and the tubular(s) in the wellbore.

The downhole tool can include any tool that can be used to detect a thermal neutron absorbing material. In one or more exemplary embodiments, the downhole tools can include one or more of logging-while-drilling (LWD) tools, measurement-while-drilling (MWD) tools, pulsed neutron capture (PNC) logging tools, compensated neutron logging tools, acoustic tools, gamma density tools, directional drilling tools, drilling tools, fishing tools, formation evaluation tools, gamma ray tools, gravity tools, magnetic resonance tools, monitoring tools, mud logging tools, neutron gamma density tools, nuclear tools, perforating tools, porosity tools, reservoir characterization tools, reservoir fluid sampling tools, stimulation tools, surveying tools and/or telemetry tools, although other downhole tools are also within the scope of the present disclosure. In one or more exemplary embodiments, the downhole tool is a compensated neutron logging tool. In one or more exemplary embodiments, the downhole tool is a PNC tool.

PNC logging tools can pulse the neutron source about every millisecond and can measure the resulting gamma radiation produced by interactions of the neutrons from the source with the nuclei of the materials in the borehole region adjacent to the logging tool. The detected PNC related gamma radiation can fall into three categories: (1) inelastic gamma radiation produced by high energy neutron interactions with the downhole nuclei, (2) thermal neutron capture gamma radiation produced almost instantaneously when the thermalized source neutrons are captured by downhole nuclei, and (3) neutron activation gamma radiation, which are produced during the subsequent radioactive decay of nuclei activated by either fast or thermal neutrons. PNC thermal neutron capture gamma ray count rate is very strongly dependent on the thermal neutron absorptive properties of the NRT tag material, as disclosed in: U.S. Pat. Nos. 8,100,177, 8,214,151, 8,234,072, 8,648,309, 8,805,615, 9,038,715; SPE papers 146744 and 152169; and Petrophysics vol. 54, No 5, pp 415-426, each of which are incorporated by reference herein in their entirety. According to several exemplary embodiments which utilize a PNC tool, the PNC logging tool generates data that includes log inelastic and capture gamma ray count rates, computed formation thermal neutron capture cross-sections, computed borehole thermal neutron capture cross-sections, computed borehole decay component count rate related parameters, and/or the computed yield of the tag material in the diverter material, as derived from analysis of the capture (and possibly inelastic) gamma ray spectra obtained by the tool.

The diverter material can be or include any material suitable for use in diverting applications. For example, the diverting material can include a carrier fluid and an aqueous swellable particle. An aqueous-swellable particle is any particle or composition that swells substantially in the presence of water or aqueous fluid. The diverter material disclosed herein also includes a thermal neutron absorbing material. According to several exemplary embodiments, the thermal neutron absorbing material comprises gadolinium, boron, cadmium, iridium, samarium, or mixtures thereof. Suitable high capture cross-section materials include gadolinium oxide, samarium oxide, boron carbide, and combinations thereof. The thermal neutron absorbing material can be blended with the carrier fluid and/or the aqueous-swellable particles of the diverting material to provide a thermal neutron absorbing material containing diverter material.

The diverter material can include the thermal neutron absorbing material in any suitable amounts. For example, the diverter material can include a thermal neutron absorbing material concentration of at least about 0.001%, at least about 0.01%, at least about 0.05%, at least about 0.1%, at least about 0.5%, or at least about 1% or more by weight of a thermal neutron absorbing material. In one or more exemplary embodiments, the diverter material includes a concentration of from about 0.01% to about 10% or more, such as about 0.03% to about 7%, such as about 0.05% to about 5%, such as about 0.1% to about 2%, such about 0.5% to about 1.0% by weight of a thermal neutron absorbing material.

The diverter material can include the thermal neutron absorbing material in any suitable amounts. For example, the loose grains of gadolinium oxide, samarium oxide, boron carbide, and combinations thereof can be blended with the carrier fluid and/or the aqueous-swellable particles of the diverting material to provide the thermal neutron absorbing material containing diverter material. In one or more exemplary embodiments, the gadolinium oxide, samarium oxide, boron carbide, and combinations thereof can be coated on and/or infused into (e.g., disposed substantially throughout) the aqueous-swellable particles to provide the thermal neutron absorbing material containing diverter material. Such aqueous-swellable particles may be manufactured according to any suitable process including continuous spray atomization, spray fluidization, spray drying, or compression.

In one or more exemplary embodiments, the thermal neutron absorbing material can be incorporated into a proppant particle that is then blended into the diverting material prior to its placement downhole. The proppant can be or include sand, ceramic proppant, gravel, or any other solid particles suitable for use in a downhole environment. The proppant can contain the thermal neutron absorbing material. For example, the slurry can include a proppant containing the thermal neutron absorbing material. The proppant doped with the thermal neutron absorbing material has a thermal neutron capture cross-section exceeding that of elements normally encountered in a subterranean formation. According to several exemplary embodiments, the proppant containing the thermal neutron absorbing material has a macroscopic thermal neutron capture cross-section of at least about 90 capture units. According to several exemplary embodiments, the proppant containing the thermal neutron absorbing material has a macroscopic thermal neutron capture cross-section of at least about 900 capture units. According to several exemplary embodiments, the proppant material is a granular ceramic material, with substantially every grain of the proppant material having a high capture cross section thermal neutron absorbing material integrally incorporated therein.

A proppant containing 0.030% by weight of gadolinium oxide has a macroscopic capture cross-section of approximately 92 capture units. A suitable proppant containing 0.1% by weight boron carbide or 0.1% samarium oxide has similar thermal neutron absorption properties.

According to several exemplary embodiments, the proppant includes a concentration of about 0.01% to about 10% or more, such as about 0.03% to about 7%, such as about 0.05% to about 5%, such as about 0.1% to about 2%, such about 0.5% to about 1.0% by weight of a gadolinium compound thermal neutron absorbing material, or a concentration of about 0.1% to 4.0%, such as about 0.5% to about 2% by weight of a samarium compound thermal neutron absorbing material. Suitable tagged proppants could also contain combinations of two or more different thermal neutron absorbing materials, such as gadolinium oxide in one portion of the proppant grains and samarium oxide in another portion of (or the balance of) the proppant grains.

According to several exemplary embodiments, the proppant may be a ceramic proppant, sand, resin coated sand, plastic beads, glass beads, and other ceramic or resin coated proppants. Such proppants may be manufactured according to any suitable process including continuous spray atomization, spray fluidization, spray drying, or compression. Suitable proppants and methods for manufacture are disclosed in U.S. Pat. Nos. 4,068,718, 4,427,068, 4,440,866, 5,188,175, and 7,036,591, the entire disclosures of which are incorporated herein by reference.

According to several exemplary embodiments, the thermal neutron absorbing material is added to the ceramic proppant during the manufacturing process such as continuous spray atomization, spray fluidization, spray drying, or compression. Ceramic proppants vary in properties such as apparent specific gravity by virtue of the starting raw material and the manufacturing process. The term "apparent specific gravity" as used herein is the weight per unit volume (grams per cubic centimeter) of the particles, including the internal porosity. Low density proppants generally have an apparent specific gravity of less than 3.0 g/cm$^3$ and are typically made from kaolin clay and alumina. Intermediate density proppants generally have an apparent specific gravity of about 3.1 to 3.4 g/cm$^3$ and are typically made from bauxitic clay. High strength proppants are generally made from bauxitic clays with alumina and have an apparent specific gravity above 3.4 g/cm$^3$. According to several exemplary embodiments, thermal neutron absorbing material may be added in the manufacturing process of any one of these proppants to result in a suitable proppant. Ceramic proppant may be manufactured in a manner that creates porosity in the proppant grain. A process to manufacture a suitable porous ceramic is described in U.S. Pat. No. 7,036,591, the entire disclosure of which is incorporated by reference herein. In this case the thermal neutron absorbing material is impregnated into the pores of the proppant grains to a concentration of from about 0.025% to about 4.0% by weight.

According to several exemplary embodiments, the thermal neutron absorbing material is incorporated into a resin material and ceramic proppant or natural sands are coated with the resin material containing the thermal neutron absorbing material. Processes for resin coating proppants and natural sands are well known to those of ordinary skill in the art. For example, a suitable solvent coating process is described in U.S. Pat. No. 3,929,191, to Graham et al., the entire disclosure of which is incorporated herein by reference. Another suitable process such as that described in U.S. Pat. No. 3,492,147 to Young et al., the entire disclosure of which is incorporated herein by reference, involves the coating of a particulate substrate with a liquid, uncatalyzed resin composition characterized by its ability to extract a catalyst or curing agent from a non-aqueous solution. Also a suitable hot melt coating procedure for utilizing phenol-formaldehyde novolac resins is described in U.S. Pat. No. 4,585,064, to Graham et al., the entire disclosure of which is incorporated herein by reference. Those of ordinary skill in the art will be familiar with still other suitable methods for resin coating proppants and natural sands.

Therefore, according to several exemplary embodiments, a method is provided which may be implemented with ceramic proppant or natural sands coated with or otherwise containing the thermal neutron absorbing material. According to several exemplary embodiments, a suitable thermal neutron absorbing material is gadolinium oxide, which has an effective thermal neutron absorbing capacity at a low concentration in tagged proppant or sand. The concentration of such thermal neutron absorbing materials can be from about 0.025% to about 4.0% by weight based on the weight of the proppant. For gadolinium compounds such as gadolinium oxide, the concentration can be from about 0.025% to about 1.0% by weight based on the weight the proppant. These concentrations are low enough such that the other properties of the tagged proppant (such as crush strength) are essentially unaffected by the addition of the high capture cross-section material. According to several exemplary embodiments, any suitable high capture cross-section thermal neutron absorbing material may be used. According to several exemplary embodiments, gadolinium oxide or other gadolinium containing materials are used because a smaller amount of the gadolinium-containing tagging material is required relative to other thermal neutron absorbing materials (such as other rare earth elements). The weight percentage required to produce similar thermal neutron absorption properties for other high thermal neutron capture cross section materials will be a function of the density and molecular weight of the material used, and on the capture cross sections of the constituents of the material.

A manufactured ceramic proppant containing about 0.025% to about 1.0% by weight of a thermal neutron absorbing material can be cost effectively produced and can provide useful identifying signals when comparing PNC log responses run before and after placement of the proppant-containing diverter material in the borehole region.

According to several exemplary embodiments which utilize a PNC logging tool, capture gamma ray spectroscopy and spectral deconvolution may be used to detect, isolate, and identify gamma radiation which was emitted following thermal neutron capture by the thermal neutron absorbing material in the diverter material.

In some embodiments, the aqueous-swellable particle is a partially dehydrated or anhydrous borate source material. The borate source material that is at least partially dehydrated or anhydrous expands or swells substantially when hydrated. Exemplary borate source material suitable for use can include anhydrous boric oxide, anhydrous sodium borate, sodium perborate monohydrate, and combinations thereof. Other aqueous-swellable particulate materials can also be used herein, for instance, particulate sodium or potassium salt of polyacrylic acid or alginic acid, polyacrylate-cellulose graft copolymer, collagen, chitin, chitosan, dextran, carboxymethyldextran, starch, modified starch, hydroxyethyl starch, hydrolyzed polyacrylonitrile, starch-methacrylonitrile polymer, polyacrylamide, hydrolyzed polyacrylamide (Separan® AP-30, Dow Chemical Co.), carboxymethylcellulose, and derivatives thereof. These aforementioned aqueous-swellable particles can be used alone or in combination. Examples of suitable aqueous-swellable particles are disclosed in U.S. Pre-Grant Publication No. 2014/0371114, to Todd et al., the entire disclosure of which is incorporated herein by reference.

The aqueous-swellable particle may have a wide range of sizes. For example, size of the particle may range from about 400 mesh to about 2 mesh (U.S. Sieve Series). In some embodiments, average size of the particles may range from about 150 mesh to about 8 mesh, or from about 40 mesh to about 8 mesh, from about 40 mesh to about 20 mesh, from about 40 mesh to about 30 mesh. or from about 14 mesh to about 8 mesh.

The choice of sizes of aqueous-swellable particles may depend on many factors such as the carrier fluid used, the concentration of the diverting composition, the anticipated swelling rate or anticipated time for bridging the stimulation network. For example, when the fractures or wormholes in the stimulation network are large enough to use a diverting composition containing aqueous-swellable particles with a large average particle size, an aqueous fluid can be used to carry the diverting composition, as the swelling of the aqueous-swellable particle may be delayed for a long enough period of time that the diverting composition can be delivered to the desired stimulation network before substantive swelling of the particles occurs. Additionally, higher concentration of the particles in the diverting composition may slow down the full contact of the particles with aqueous solution, and hence may delay the swelling of the aqueous-swellable particles.

In one embodiment, the average size of the aqueous-swellable particles is about 14 mesh or larger, and the swelling of the particles can be delayed for at least about 10 minutes. In one embodiment, the average size of the aqueous-swellable particles ranges from about 14 mesh to about 8 mesh, and the swelling of the particles can be delayed for at least about 10 minutes, 20 minutes, or 30 minutes or more. For instance, boric oxide at 8 mesh size typically swells less than 30% after 30 minutes in water, less than 25% after 20 minutes in water and less than 20% after 10 minutes in water. Accordingly, it is possible to use an aqueous fluid as the carrier fluid when the aqueous-swellable particle will not swell substantially and immediately when placed in contact with the carrier fluid.

On the other hand, when the average sizes of the aqueous-swellable particles are small enough, the aqueous-swellable particles may swell instantaneously or nearly instantaneously (e.g., within seconds, or within 1 minute to 10 minutes), once exposed to aqueous fluid to seal the stimulation network. When the average size of the aqueous-swellable particles is about 30 mesh or smaller, substantial swelling of the particles (e.g. 25%-40%) may occur within 1 minute thereby sealing the stimulation network. For example, when the average size of aqueous-swellable particles is about 40 mesh size or smaller, substantial swelling of the particles (e.g. 25%-40%) may occur instantaneously (e.g., within seconds) upon contact with aqueous fluid; and when the average size of the aqueous-swellable particles ranges from about 40 mesh to about 30 mesh, substantial swelling of the particles (e.g. 25%-40%) may occur within 1 minute after exposing the diverting composition to the aqueous liquid. When the average size of the aqueous-swellable particles is about 30 mesh or larger, substantial swelling of the particles may occur within 3 to 30 minutes thereby sealing the stimulation network. For instance, when the average size of aqueous-swellable particles ranges from about 30 mesh to about 10 mesh, substantial swelling of the particles (e.g. 25%-40%) may occur within 3 to 10 minutes after exposing the diverting composition to the aqueous liquid.

The diverting composition may also comprise other particulate materials. These particulate materials may be blended with the aqueous-swellable particle to form a diverting composition in the carrier fluid. Suitable particular materials can include ceramic beads, bauxite, glass microspheres, synthetic organic beads, sintered materials and combinations thereof. Suitable particular materials may also include polymer materials, Teflon® materials, nut shell pieces, seed shell pieces, cured resinous particulates comprising nut shell pieces, cured resinous particulates comprising seed shell pieces, fruit pit pieces, cured resinous particulates comprising fruit pit pieces, wood, composite particulates and combinations thereof.

In some embodiments, the particulate materials to be blended with the aqueous-swellable particles are degradable materials including degradable polymers, dehydrated compounds, and mixtures thereof. Suitable examples of degradable polymers that may be used can include homopolymers, and random, block, graft, and star- or hyper-branched polymers. Specific examples of suitable polymers include polysaccharides such as dextran or cellulose, chitin, chitosan, proteins, aliphatic polyesters, poly(lactide), poly(glycolide), poly(ε-caprolactone), poly(hydroxybutyrate), poly(anhydrides), aliphatic polycarbonates, poly(ortho esters), poly(amino acids), poly(ethylene oxide), and polyphosphazenes. Polyanhydrides are another type of suitable degradable polymer. Examples of suitable polyanhydrides include poly(adipic anhydride), poly(suberic anhydride), poly(sebacic anhydride), and poly(dodecanedioic anhydride). Other suitable examples can include poly(maleic anhydride) and poly(benzoic anhydride). The aforementioned materials may be found, for instance, in U.S. Patent Application Publication Nos. 2009/0223667 and 2009/0242202, which are incorporated herein by reference in their entirety.

In one or more exemplary embodiments, the aqueous-swellable particle is suspended in the carrier fluid and placed into a stimulation network in the subterranean formation by introducing the fluid carrying the aqueous-swellable particles into the subterranean formation. The diverting composition may be pumped into the stimulation network. The pumping rate and pressure as well as pumping techniques may be similar as those described in U.S. Pat. No. 8,074,715, which is incorporated herein by reference in its entirety.

The concentration of the aqueous-swellable particle may range from about 10 pounds per thousand gallons of carrier fluid (10 lbs/Mgal) to about 4000 lbs/Mgal, for instance, from about 20 lbs/Mgal to about 1000 lbs/Mgal, or from about 100 lbs/Mgal to about 500 lbs/Mgal. Low-concentration diverting compositions may not permit sufficient packing of the aqueous-swellable particles within the stimulation network to seal the fractures or wormholes; however, diverting composition with too high a concentration and excessive densities may result in material deposits within the undesirable locations. When other particulate materials are used in the diverting composition, the concentration of aqueous-swellable particles may be reduced accordingly and the aqueous-swellable particles may still present in sufficient amounts to seal the fractures or wormholes. The volume percentage of the aqueous-swellable particle in the diverting composition may range from about 0.04% v/v to about 16% v/v, such as about 0.0456% v/v to about 15.4% v/v, for instance, from about 0.1% v/v to about 4.4% v/v, or from about 0.5% v/v to about 2.2% v/v.

The carrier fluid may also comprise a viscosity-increased substance, such as a gelling agent for gelling the fluid and increasing its viscosity. The increased viscosity of the carrier fluid may control and/or reduce fluid loss into the subterranean formation, enhance the suspension properties of the carrier fluid and allow the carrier fluid to transport significant quantities of suspended particles. In certain subterranean operations, increased viscosity of the carrier fluid may also provide additional benefits, such as creating or enhancing fracture width in fracturing treatment. The gelling agents may be biopolymers comprising natural, modified and derivatized polysaccharides, or derivatives thereof. Suitable gelling agents can include xanthan, diutan, guar and derivatives of guar gum, galactomannan gum, cellulose and derivatives thereof, and combinations thereof. The carrier fluid may also include one or more of a variety of well-known additives such as breakers, stabilizers, fluid-loss-control additives, clay stabilizers, bactericides, and the like.

As used herein, a material is considered to be "aqueous swellable" if a volume of the material can expand at least about 2.5%, at least about 5%, or at least about 10% in the presence of an aqueous fluid. Some of the aqueous-swellable particles used herein are known to expand in an aqueous fluid about 100% (200% of its original volume). In some embodiments, the aqueous-swellable particle expands to at least about 20% (120% of its original volume) to about 50% (150% of its original volume) when exposed to the aqueous liquid. For example, anhydrous boric oxide in various seawater solution of scale inhibitors or 15% hydrochloric acid expands at least to about 120% of its original volume, and more typically in the range of about 150% to about 210% of its original volume, depending on the aqueous solution. Anhydrous sodium tetraborate in a 10% ammonium salt containing a scale inhibitor/seawater solution expands to about 120% of its original volume.

Some aqueous-swellable materials may be sensitive to pH and other factors. The level of volume expanding of the material may be dependent on the particular aqueous solution used. Some aqueous-swellable materials may expand when exposed to a basic aqueous fluid, and may not expand in an acidic fluid. For example, anhydrous sodium borate can be water-swellable when exposed to basic aqueous fluids, but it may swell slightly, or not at all, in some neutral or acidic solutions.

For expanding the swellable particles in the diverting composition, an additional source of aqueous fluid may be introduced into the subterranean formation after the aqueous-swellable particle is placed in the desired location. Alternatively, the aqueous fluid may be already contained in the subterranean formation at the time the diverting composition is introduced into the stimulation network. For instance, when the carrier fluid is an aqueous fluid, additional aqueous fluid may or may not need to be introduced into the subterranean formation to swell the particles. The aqueous fluid used to expand the aqueous-swellable particles may be fresh water, salt water (e.g., water containing one or more salts dissolved therein), brine (e.g., saturated salt water), seawater, formation water, or various other aqueous treatment fluids introduced into the subterranean formation during various treatments.

As the diverting composition travels down into the stimulation network in the subterranean formation, the diverting composition may gradually mix with the aqueous fluid contained in the subterranean formation, and eventually, the swellable particle may be exposed to sufficient aqueous fluid to swell and fill one or more perforations and/or one or more fractures.

In some embodiments, the aqueous-swellable particle bridges or fills the stimulation network temporarily and can be removed by exposing the diverting composition to a sufficient amount of aqueous liquid to at least partially dissolve and degrade the expanded diverting composition. The solubility of a substance is the maximum amount of a material that can be dissolved in a given quantity of a given solvent at a given temperature. A material is considered soluble or dissolvable even if it takes a substantial amount of time to reach saturation. Hence aqueous soluble or aqueous dissolvable particles may also refer to materials that are eventually soluble or dissolvable after the stimulation network has been sealed and after desired diversion is complete so that the expanded diverting composition that have sealed the stimulation network can be removed without cleaning-up or mechanical removal procedures.

After desired diversion is complete, the expanded particle will at least partially dissolve in aqueous solution and degrade away. In some embodiments, depending on the temperature and the type of aqueous fluid used, the same aqueous liquid that initially expands the diverting composition, after contacting with the diverting composition for a sufficient time, may be present in an amount sufficient to hydrate the aqueous-swellable particles and at least partially dissolve the expanded diverting composition. In other embodiments, the aqueous liquid used to hydrate the aqueous-swellable particles and to dissolve the expanded diverting composition is different from the aqueous fluid initially expands the diverting composition. For example, after desired diversion is complete, an additional source of aqueous liquid may be introduced into subterranean formation to hydrate or speed and/or complete the hydration and dissolution of the aqueous-swellable particles in the diverting composition.

An aqueous treatment fluid may be used to swell and/or dissolve the aqueous-swellable particles. As used herein, the term "treatment fluid" generally refers to any fluid that may be used in a subterranean application in conjunction with a desired function and/or for a desired purpose. The term "treatment fluid" does not imply any particular action by the fluid or any component thereof. Exemplary treatment fluids can include aqueous acid solution, aqueous scale inhibiting material solution, aqueous water blocking material solution, aqueous corrosion inhibiting material solution, aqueous clay stabilizer solution, aqueous shale stabilizer solution, aqueous friction reducer solution, aqueous chelating agent solution, aqueous surfactant solution, aqueous paraffin removal solution, aqueous biocide solution, aqueous non-emulsifier solution, and combinations thereof. For example, the aqueous acid solution can include one or more acids such as hydrochloric acid, hydrofluoric acid, acetic acid, formic acid and other organic acids, and combinations thereof. The aqueous scale inhibitor material solution can contain one or more scale inhibitor materials including tetrasodium ethyleneamine acetate, pentamethylene phosphonate, hexamethylenediamine phosphonate, polyacrylate and combinations thereof.

In addition, after desired diversion is complete, additional treatment fluids, same or different from the previous aqueous treatment fluid, may be flowed into subterranean formation for further treatments or operations. Any treatments or operations can be used after the subterranean formation has been treated with the diverting composition, including stimulation, completion, fracturing, acidizing, workover, and combinations thereof.

In some embodiments, the diverting composition is used in accordance with fracture treatments. To create new fractures and to extend the fracture network, it may be desirable to seal existing fractures so that treatment fluids can be diverted to the untreated portion of the subterranean formation, e.g., to expand the volume of the fracture network (or wormhole network) and to expand the volume of the subterranean formation being treated without damaging existing fractures. With the diverting composition placed in the desired locations or perforations, the existing fractures or fracture networks are protected and successive fracturing treatments can be performed to extend the fracture network.

A well site operation can involve blending a carrier fluid with a thermal neutron absorbing material (either by itself or as doped onto proppant) and aqueous-swellable particles, creating a slurry, which is pumped down the well. The pumped slurry is pumped into the borehole region, into perforations in the casing and possibly into fractures induced in the formation adjacent to the borehole region.

In one or more exemplary embodiments, a logging truck at the well site can lower a neutron, compensated neutron, or PNC logging tool to a depth of the pack material placed in the borehole region. Power from the logging truck (or skid) can be transmitted to the logging tool, which records and transmits logging data as the tool is logged past the pack material placed in the borehole region and the formations above and/or below the pack material.

According to several exemplary embodiments, the use of PNC calculated taggant (e.g. gadolinium) yields computed from PNC tool capture gamma ray spectra to locate NRT tagged pack material in diverting operations, including a new capture gamma ray spectroscopy-based method to assist in detecting the diverter material placed in the borehole region.

According to embodiments of the present invention, the induced hydraulic fracture and packed interval identification process using a proppant having a thermal neutron absorbing material and measurements from a PNC logging tool includes:

1. Preparing diverter material by mixing a thermal neutron absorbing material with a carrier fluid and aqueous-swellable particles. In one or more exemplary embodiments, the diverter material can be prepared by: 1) doping a proppant with a thermal neutron absorbing material by fabricating the proppant from starting materials that include a thermal neutron absorbing material, by coating the thermal neutron absorbing material onto the proppant or by impregnating or otherwise incorporating the thermal neutron absorbing material into the proppant; and 2) mixing the thermal neutron absorbing material with a carrier fluid and aqueous swellable particles.
2. Running and recording, or otherwise obtaining, a pre-diverter PNC log across the potential zones to be fractured to obtain a pre-diverter data set.
3. Conducting a diverter operation in the well, incorporating the thermal neutron absorbing material into the slurry of diverter material pumped downhole.
4. Running and recording a post-diverter PNC log, if possible utilizing the same tool type as used in the pre-diverter log, across the potential zones of interest, including one or more fracture/perforation intervals to obtain a post-diverter data set. The logs may be run with the tool centered or eccentered within the casing or tubing.
5. Comparing the pre-diverter and post-diverter data sets from the pre-diverter and post-diverter logs (after any log normalization), to determine location of diverter material.

Normalization may be desirable if the pre-diverter and post-diverter logs were run with different borehole conditions, or if different tools or sources were used. This may be especially true if the pre-diverter log was recorded at an earlier time in the life history of the well, using wireline, memory, and/or logging-while-drilling (LWD) sensors. Normalization procedures compare the log data from zones preferably outside of the possibly diverted intervals in the pre-diverter and post-diverter logs. Since these zones have not changed between the logs, the gains and/or offsets are applied to the logs to bring about agreement between the pre-diverter and post-diverter logs in these normalization intervals. The same gains/offsets are then applied to the logs over the entire logged interval. Differences in the data indicate the presence of diverter material in the borehole region.

Further embodiments of the present invention include changes in the methods described herein such as incorporating multiple pre-diverter logs into any pre-diverter versus post-diverter comparisons, or the use of a simulated log for the pre-diverter log (such simulated logs being obtained for instance using neural networks to generate simulated neutron, compensated neutron, or PNC log responses from other open or cased hole logs on the well), or the use of multiple stationary logging measurements instead of, or in addition to, data collected with continuous logs.

In additional embodiments, first and second post-diverter data sets are obtained and utilized to determine the differences, if any, between the locations and/or quantities of diverter material in the perforated zones in the borehole region. The determined diverter material location differences can be utilized to determine if any diverter material from the one or more diverter locations was effectively dissolved, degraded or removed in any diverter removal procedure such as those described above. The determined diverter material location differences can also be utilized to determine if/which perforations are open to the subterranean formation and which perforations remain closed to the surrounding subterranean formation due to the presence of the diverter material. This post-diverter procedure may be carried out using a compensated neutron logging tool or a pulsed neutron capture logging tool, possibly augmented with other wellsite information or information provided by other conventional logging tools, such as production logging tools.

According to certain embodiments of the thermal neutron logging method, fast neutrons are emitted from a neutron source into the borehole region, and are rapidly thermalized to thermal neutrons by elastic and inelastic collisions with borehole region nuclei. Elastic collisions with hydrogen in the borehole region are a principal thermalization mechanism. The thermal neutrons diffuse in the borehole region, and are eventually absorbed by one of the nuclei present. Generally these absorption reactions result in the almost simultaneous emission of capture gamma rays; however, absorption by boron is a notable exception. The detectors in the PNC logging tool either directly detect the thermal neutrons that are scattered back into the tool (in most neutron and compensated neutron tools, and also in some versions of PNC tools), or indirectly by detecting the gamma rays resulting from the thermal neutron absorption reactions (in some versions of neutron and compensated neutron tools, and in most commercial versions of PNC tools). Most compensated neutron and PNC tools are configured with a neutron source and two detectors arranged above the neutron source which are referred to herein as a "near" detector and a "far" detector. According to some embodiments, compensated neutron and pulsed neutron capture tools may be used that include one detector, or more than two detectors. For example, suitable compensated neutron and PNC tools can incorporate a neutron source and three detectors arranged above the neutron source, which are referred to herein as the near, far, and "extra-far" or "xfar" detectors such that the near detector is closest to the neutron source and the xfar detector is the farthest away from the neutron source. It is also possible that one or more of the neutron or capture gamma ray detectors may be located below the neutron source.

A pulsed neutron capture tool logging system measures the decay rate (as a function of time between the neutron pulses) of the thermal neutron or capture gamma ray population in the formation and the borehole region. From this decay rate curve, the capture cross-section of the borehole $\Sigma_{bh}$ (sigma-bh), and the borehole decay component can be resolved and determined. The higher the total capture cross-sections of the materials in the borehole region, the greater the tendency for that material to capture thermal neutrons. Therefore, in a borehole region having a high total capture cross-section, the thermal neutrons disappear more rapidly than in a formation having a low capture cross-section. This appears as a steeper slope in a plot of the observed count rate versus time after the neutron burst.

The differences between the PNC borehole pre-diverter and post-diverter parameters can be used to determine the presence and/or absence of diverter material in the borehole region.

Embodiments

Clause 1. A method for detecting diverter material placed in a borehole region, comprising:
(a) obtaining a first data set by:
(i) lowering into a borehole traversing the borehole region a pulsed neutron logging tool comprising a pulsed neutron source and a detector,
(ii) emitting pulses of neutrons from the pulsed neutron source into the borehole region,
(iii) detecting capture gamma rays resulting from nuclear reactions in the borehole region;
(b) placing a diverter material comprising aqueous-swellable particles and a thermal neutron absorbing material into the borehole region;
(c) obtaining a second data set by:
(i) emitting pulses of neutrons from the first pulsed neutron source or a second pulsed neutron source into the borehole region,
(ii) detecting capture gamma rays in the borehole; and
(d) comparing the first data set and the second data set to determine the location of diverter material placed in the borehole region.

Clause 2. The method of Clause 1, wherein the thermal neutron absorbing material comprises gadolinium, boron carbide, or samarium or any combinations thereof.

Clause 3. The method of Clause 1, wherein the diverter material comprises the thermal neutron absorbing material from about 0.01% to about 10% based on the total weight of the diverter material.

Clause 4. The method of Clause 1, wherein the aqueous-swellable particles are selected from the group consisting of anhydrous boric oxide, anhydrous sodium borate, sodium perborate monohydrate, sodium perborate trihydrate, and combinations thereof.

Clause 5. The method of Clause 1, wherein the thermal neutron absorbing material is coated on the aqueous-swellable particles.

Clause 6. The method of Clause 1, wherein the aqueous-swellable particles are independently selected from anhydrous boric oxide, anhydrous sodium borate, sodium perborate monohydrate, and combinations thereof.

Clause 7. The method of Clause 1, wherein the aqueous-swellable particles are independently selected from sodium or potassium salt of polyacrylic acid or alginic acid, polyacrylate-cellulose graft copolymer, collagen, chitin, chitosan, dextran, carboxymethyldextran, starch, modified starch, hydroxyethyl starch, hydrolyzed polyacrylonitrile, starch-methacrylonitrile polymer, polyacrylamide, hydrolyzed polyacrylamide, carboxymethylcellulose, and derivatives thereof.

Clause 8. The method of Clause 1, wherein the aqueous-swellable particles have an average size of from about 150 mesh to about 8 mesh.

Clause 9. The method of Clause 1, wherein the aqueous-swellable particles are present in an aqueous composition at a concentration of from about 20 lbs/Mgal to about 1000 lbs/Mgal.

Clause 10. The method of Clause 1, wherein the aqueous-swellable particles are present in an aqueous composition at a volume percentage of from about 0.04% v/v to about 16% v/v.

Clause 11. A method for detecting diverter material placed in a borehole region, comprising:
(a) placing a diverter material comprising aqueous-swellable particles and a thermal neutron absorbing material coated on the aqueous-swellable particles into the borehole region;
(b) obtaining a first data set by:
(i) lowering into a borehole traversing the borehole region a pulsed neutron logging tool comprising a pulsed neutron source and a detector,
(ii) emitting pulses of neutrons from the pulsed neutron source into the borehole region,
(iii) detecting capture gamma rays in the borehole region;
(c) removing at least a portion of the diverter material from the borehole region;
(d) obtaining a second data set by:
(i) emitting pulses of neutrons from the first pulsed neutron source or a second pulsed neutron source into the borehole region,
(ii) detecting capture gamma rays in the borehole; and
(e) comparing the first data set and the second data set to determine the effectiveness of removal of the diverter material placed in the borehole region.

Clause 12. The method of Clause 11, wherein the thermal neutron absorbing material comprises gadolinium, boron carbide, or samarium or any combinations thereof.

Clause 13. The method of Clause 12, wherein the diverter material comprises the thermal neutron absorbing material from about 0.01% to about 10% based on the total weight of the diverter material.

Clause 14. The method of Clause 13, wherein the aqueous-swellable particles are selected from the group consisting of anhydrous boric oxide, anhydrous sodium borate, sodium perborate monohydrate, sodium perborate trihydrate, and combinations thereof.

Clause 15. The method of Clause 14, wherein the aqueous-swellable particles have an average size of from about 150 mesh to about 8 mesh.

Clause 16. The method of Clause 11, wherein the aqueous-swellable particles are independently selected from sodium or potassium salt of polyacrylic acid or alginic acid, polyacrylate-cellulose graft copolymer, collagen, chitin, chitosan, dextran, carboxymethyldextran, starch, modified starch, hydroxyethyl starch, hydrolyzed polyacrylonitrile, starch-methacrylonitrile polymer, polyacrylamide, hydrolyzed polyacrylamide, carboxymethylcellulose, and derivatives thereof.

Clause 17. The method of Clause 11, wherein the aqueous-swellable particles have an average size of from about 150 mesh to about 8 mesh.

Clause 18. The method of Clause 11, wherein the aqueous-swellable particles are present in an aqueous composition at a concentration of from about 20 lbs/Mgal to about 1000 lbs/Mgal.

Clause 19. The method of Clause 11, wherein the aqueous-swellable particles are present in an aqueous composition at a volume percentage of from about 0.04% v/v to about 16% v/v.

Clause 20. A diverter material comprising: an aqueous-swellable particle; and a thermal neutron absorbing material.

Clause 21. The diverter material of Clause 20, wherein the thermal neutron absorbing material is coated on the aqueous-swellable particle.

Clause 22. The diverter material of Clause 20, wherein the thermal neutron absorbing material comprises gadolinium, boron carbide, or samarium or any combinations thereof.

Clause 23. The diverter material of Clause 22, wherein the diverter material comprises the thermal neutron absorbing material from about 0.01% to about 10% based on the total weight of the diverter material.

Clause 24. The diverter material of Clause 23, wherein the aqueous-swellable particles are selected from the group consisting of anhydrous boric oxide, anhydrous sodium borate, sodium perborate monohydrate, sodium perborate trihydrate, and combinations thereof.

Clause 25. The diverter material of Clause 24, wherein the aqueous-swellable particles have an average size of from about 150 mesh to about 8 mesh.

Clause 26. The diverter material of Clause 23, wherein the aqueous-swellable particles are independently selected from sodium or potassium salt of polyacrylic acid or alginic acid, polyacrylate-cellulose graft copolymer, collagen, chitin, chitosan, dextran, carboxymethyldextran, starch, modified starch, hydroxyethyl starch, hydrolyzed polyacrylonitrile, starch-methacrylonitrile polymer, polyacrylamide, hydrolyzed polyacrylamide, carboxymethylcellulose, and derivatives thereof.

Clause 27. The diverter material of Clause 26, wherein the aqueous-swellable particles have an average size of from about 150 mesh to about 8 mesh.

The foregoing detailed description is to be clearly understood as being given by way of illustration and example only, the spirit and scope of the present invention being limited solely by the appended claims.

What is claimed is:

1. A method for detecting diverter material placed in a borehole region, comprising:
    (a) obtaining a first data set by:
        (i) lowering into a borehole traversing the borehole region a pulsed neutron logging tool comprising a pulsed neutron source and a detector,
        (ii) emitting pulses of neutrons from the pulsed neutron source into the borehole region,
        (iii) detecting capture gamma rays resulting from nuclear reactions in the borehole region;
    (b) placing a diverter material comprising aqueous-swellable particles and a thermal neutron absorbing material into the borehole region;
    (c) obtaining a second data set by:
        (i) emitting pulses of neutrons from the first pulsed neutron source or a second pulsed neutron source into the borehole region,
        (ii) detecting capture gamma rays in the borehole; and
    (d) comparing the first data set and the second data set to determine the location of diverter material placed in the borehole region.

2. The method of claim 1, wherein the thermal neutron absorbing material comprises gadolinium, boron carbide, or samarium or any combinations thereof.

3. The method of claim 1, wherein the diverter material comprises the thermal neutron absorbing material from about 0.01% to about 10% based on the total weight of the diverter material.

4. The method of claim 1, wherein the aqueous-swellable particles are selected from the group consisting of anhydrous boric oxide, anhydrous sodium borate, sodium perborate monohydrate, sodium perborate trihydrate, and combinations thereof.

5. The method of claim 1, wherein the thermal neutron absorbing material is coated on the aqueous-swellable particles.

6. The method of claim 1, wherein the aqueous-swellable particles are independently selected from anhydrous boric oxide, anhydrous sodium borate, sodium perborate monohydrate, and combinations thereof.

7. The method of claim 1, wherein the aqueous-swellable particles are independently selected from sodium or potassium salt of polyacrylic acid or alginic acid, polyacrylate-cellulose graft copolymer, collagen, chitin, chitosan, dextran, carboxymethyldextran, starch, modified starch, hydroxyethyl starch, hydrolyzed polyacrylonitrile, starch-methacrylonitrile polymer, polyacrylamide, hydrolyzed polyacrylamide, carboxymethylcellulose, and derivatives thereof.

8. The method of claim 1, wherein the aqueous-swellable particles have an average size of from about 150 mesh to about 8 mesh.

9. The method of claim 1, wherein the aqueous-swellable particles are present in an aqueous composition at a concentration of from about 20 lbs/Mgal to about 1000 lbs/Mgal.

10. The method of claim 1, wherein the aqueous-swellable particles are present in an aqueous composition at a volume percentage of from about 0.04% v/v to about 16% v/v.

11. A method for detecting diverter material placed in a borehole region, comprising:
    (a) placing a diverter material comprising aqueous-swellable particles and a thermal neutron absorbing material coated on the aqueous-swellable particles into the borehole region;
    (b) obtaining a first data set by:
        (i) lowering into a borehole traversing the borehole region a pulsed neutron logging tool comprising a pulsed neutron source and a detector,
        (ii) emitting pulses of neutrons from the pulsed neutron source into the borehole region,
        (iii) detecting capture gamma rays in the borehole region;
    (c) removing at least a portion of the diverter material from the borehole region;
    (d) obtaining a second data set by:
        (i) emitting pulses of neutrons from the first pulsed neutron source or a second pulsed neutron source into the borehole region,
        (ii) detecting capture gamma rays in the borehole; and
    (e) comparing the first data set and the second data set to determine the effectiveness of removal of the diverter material placed in the borehole region.

12. The method of claim 11, wherein the thermal neutron absorbing material comprises gadolinium, boron carbide, or samarium or any combinations thereof.

13. The method of claim 12, wherein the aqueous-swellable particles are selected from the group consisting of anhydrous boric oxide, anhydrous sodium borate, sodium perborate monohydrate, sodium perborate trihydrate, sodium or potassium salt of polyacrylic acid or alginic acid, polyacrylate-cellulose graft copolymer, collagen, chitin, chitosan, dextran, carboxymethyldextran, starch, modified starch, hydroxyethyl starch, hydrolyzed polyacrylonitrile, starch-methacrylonitrile polymer, polyacrylamide, hydrolyzed polyacrylamide, carboxymethylcellulose, and derivatives thereof.

* * * * *